United States Patent Office 3,087,813
Patented Apr. 30, 1963

3,087,813
NON-CORROSION SOLDER FOR LIGHT METAL ALLOYS
Fumio Ueno, Nakano-ku, Tokyo-to, Japan, and Urui Horiuchi, deceased, late of Ota-ku, Tokyo-to, Japan, by Shizuko Horiuchi, heiress, Ota-ku, Tokyo-to, Japan, assignors, by mesne assignments, to Acas International Limited, Hong Kong, a corporation of Hong Kong
No Drawing. Filed Jan. 30, 1961, Ser. No. 85,917
Claims priority, application Japan Jan. 30, 1960
1 Claim. (Cl. 75—175)

This invention relates to solders for soldering light metals and alloys, and more particularly it relates to a new and improved solder of low melting point, having excellent properties during and after the soldering operation, suitable for soldering aluminum and its alloys.

Heretofore, the soldering of metal alloys such as those of aluminum has been considered to be difficult because of many reasons, the principal, overall reason being the non-existence of a suitable solder. The conventional solders of this type used heretofore, in general, have melting points of 350° C. or higher, which are substantially close to the melting points of small size pieces of the light metal alloys themselves. Moreover, such light metal alloys tend to have high thermal conductivities and high coefficients of thermal expansion, which tend to cause deformations in the metal pieces to be joined, particularly since, in the use of such solders, it has been necessary to heat the said metal pieces to the melting temperature of the solder. Accordingly, in actual practice, it has been almost impossible to use such conventional solders for soldering thin pieces or small pieces of such light metal alloys.

Furthermore, light metal alloys such as those of aluminum oxidize readily, and the oxide film formed is detrimental in that it does not readily interfuse with the metals which are the principal constituents of such conventional solders. If, in order to remove the oxide film, an alkaline flux is used, or if the solder contains zinc or magnesium, the low electric potential of the light metal alloy will tend to cause electrolytic corrosion. Consequently, the durability of the resulting solder joint cannot be depended upon, and the joint will undergo discoloration in the time after which it was jointed.

It is, therefore, an essential object of the present invention to provide a new and improved solder of low melting point by the use of which strong, durable, and non-discoloring solder joints with a high degree of mutual interdiffusion of metals can be made, particularly between alloys of light metals such as aluminum, even when the parts to be joined are of thin or small dimensions.

It is another object of the invention to provide a solder as specified above which, in addition, can be applied in most instances with simple apparatus, such as an ordinary soldering iron of the type used for soldering with common tin-lead solders.

It is yet another object of the invention to provide a solder such as specified above which, in addition, can be used for soldering without the aid of a soldering flux.

Said objects, other objects, and advantages have been achieved by the solder of this invention which we have developed, and which is anti-corrosive in open air or even in salt water or alkaline liquid and in acid solutions.

This is the most important and unique point of this invention. The solder of this invention, in general, consists of: 1.5 to 3% silver; 72 to 94% tin; 1 to 3% copper; 6 to 9% aluminum; 0.2 to 0.4% silicon; 0.1 to 0.3% indium; 3 to 5% cadmium and small amounts of other metals. We have discovered that this solder can be used effectively for soldering at a temperature within a range of from 160° C. to 250° C., the said temperature being adjustable by varying the composition of the solder to suit the requirement of the application. Such a conveniently low range of soldering temperature has heretofore been unattainable together with the other advantages of the solder of the present invention.

Each of the constituent elements composing the solder of this invention is intentionally added because of its significant effect in improving the properties of the solder. Some of these effects have been well known; others have been reevaluated by use to be of great importance in the particular composition of the solder of the invention.

In the composition of this solder, a large percentage of tin is used for its corrosion-resistant property. Cadmium is used for its effect of lowering the melting point of the product and also because of its high corrosion-resistance to saline solutions, its insolubility in alkaline solutions, and its property of diffusion readily into the structures of other metals. Aluminum is used in order to reduce the difference in electric potential between the solder joint and the joined parts so as to prevent the flow of local, electrolytic current, the possibility of electrolytic corrosion being relatively great in the case when aluminum alloy parts are to be thus joined. Since silver has the property of absorbing hydrogen while in the molten state and discharging the same when cooled, it is added to prevent the formation of an oxide film (clouding) on the surface of the solder alloy due to the heating thereof. Copper is added because of its property of readily alloying with other metals. Indium is added because of its low melting point and high boiling point, its high resistance against alkalis, its property of readily combining with copper and silicon, and its property of enabling the product solder to be bonded firmly with metals other than aluminum or alloys of aluminum. We have found that indium is an effective additive constituent when used in the small quantity indicated above, but tends to be detrimental to the mechanical properties of the solder when used excessively. Other metallic elements are used to adjust the melting point of the solder and to reduce the electric potential difference between the solder joint and the metal parts to be joined.

Silicon is added to the solder in addition to the above-mentioned metals. Silicon in small quantities melts readily with metals to become a solid solution, reduces the oxides present, increases the fluidity of the molten alloy, and by eliminating the brittleness of the solder joint, increases its toughness.

While the foregoing properties of the individual alloying elements are well known or were reconfirmed in our research and are, therefore, to be expected to the extent commonly known in the art, the significant importance of the invention lies in the fact that the unique combination of advantageous properties, as described herein, of the solder of this invention is attainable only when the above-mentioned elements are combined in the relative quantities stated above and in the fact that, in the alloy composition indicated above, the combined advantageous effect of the constituents exceeds the summation of the individual effects of the elements which would be expected according to prior knowledge in the art.

Two representative examples as described below will serve to illustrate the properties of the solder alloy according to this invention.

EXAMPLE 1

A solder alloy according to the invention was produced by melting together 20 grams of silver, 900 grams of tin, 20 grams of copper, and 70 grams of aluminum; adding successively into this melt 3 grams of silicon, 2 grams of indium, and 40 grams of cadmium; and causing the entire batch to melt and mix thoroughly.

The product solder thus obtained had advantageous properties as outlined below.

(1) This non-corrosive solder could be used in soldering together parts made of the same kind of metal without the use of any kind of flux.

(2) The solder, at low temperature, diffused and permeated well into the structure of light metals to form a solid solution.

(3) The solder could be used in the same manner as a common solder of the tin-lead type.

(4) The properties of the solder could be adjusted to suit the required soldering temperature.

(5) The solder formed solder joints which were tough, had strengths comparable to those of the parts joined, were free of brittleness, and were not discolored or tarnished even in Al.

(6) The solder could be used for soldering, in addition to aluminum and aluminum alloys, products such as alloy castings and die-castings of metals such as hydronilium, lautal, and silmin; magnesium alloys; and tin plate.

(7) The solder diffused and permeated into the metal structure of the parts to be joined even when the oxide film was not removed beforehand from the surfaces of said parts.

(8) The solder produced solder joints which had color and luster similar to those of the parts joined, and which did not corrode or tarnish even in salt solutions or alkaline or acid solutions.

Results of tests, which partly substantiate the above results, on the solder of this invention used in soldering aluminum sheet (designation 52S according to Japanese Industrial Standards) are as follows:

(1) Melting point _____ °C__ 200
    Solidification point _____ °C__ 220
(2) Tensile strength test on plain, single lap joint:
    Thickness of plates _____ mm__ 0.49
    Thickness of lap joint _____ mm__ 1.24
    Length of lap joint _____ mm__ 17.90
    Width of lap joint _____ mm__ 18.00
    Ultimate tensile load _____ kg__ 115
    Tensile strength _____ kg./mm.$^2$__ 13

In this case breakage occurred in the mother metal.
NOTE.—The tensile strength value measured is not the true strength of the joint since the failure occurred in one of the plates joined.

(3) Tensile strength on butt, V-bevel joint: Tensile strength _____ kg./mm.$^2$__ 7.03
(4) Bending test:
    Test piece bent acutely
    Angle at which crack appeared:
        Lap joint; at 180° front no crack, back part crack
        Butt, V-bevel joint. 150° crack
(5) Corrosion tests: Test piece dimensions
    mm__ 0.7 x 50 x 110
    (1) Two aluminum pieces were soldered together with the solder at 200° C. and placed in a continuously boiling, 5% aqueous solution of salt.
        Result: The solder joint withstood 10 weeks of this test without any visible effect.
    (2) Two aluminum pieces were soldered together with the solder at 200° C. and immersed for 24 hours in a 5% aqueous solution of sulfuric acid.
        Result: The aluminum plates were dissolved away, but the solder joint remained intact.
    (3) Two aluminum pieces were soldered together with the solder at 200° C. and immersed for 24 hours in a 5% aqueous solution of caustic soda (sodium hydroxide).
        Result: The aluminum plates were dissolved substantially, becoming very thin, but the solder joint remained intact.
    (4) Two aluminum pieces were soldered together with the solder at 250° C. and immersed for 7 days in a 5% aqueous solution of hydrochloric acid.
        Result: The solder joint exhibited no change in color and no evidence of corrosion.

EXAMPLE 2

(The following example is an excerpt from a test report, wherein the solder of the present invention is called "ACAS solder.")

Report on Comparative Experiments With Aluminum Solders, April 27, 1960, Gas Welding Unit, Welding Dept., Shipbuilding Division, Uraga Dockyard Co., Ltd., Japan:
(I) Purpose of the experiments—
The objective of these experiments was to determine the joining characteristics and workability of three different types of low temperature aluminum solders now available on the market; and further to determine the suitability of such solders for use on aluminum structural (mainly fittings) joints in shipbuilding.
(II) Experimental—
    (A) Determination of melting and solidification points
    (B) Bending and tensile strength tests
        (1) Test materials:
            (i) Material for joining—52S Aluminum Sheet for 1 mm. thickness
            (ii) Solders—
                (a) ACAS solder (ACAS Metal Industries Co., Ltd.)
                (b) Almit (Japan Aluminum Solder Co., Ltd.)
                (c) Alumisolder (Japan Aluminum Solder Mfg. Co., Ltd.)
        (2) Equipment:
            (i) Electro-thermometer, Chino, Al-Cr thermocouple, 20 mv.–50 mv. range
            (ii) Small gas welding torch, Tanaka, #300 nozzle. Carbonized flame
            (iii) Tensile and bend strength testing machine, Amsler
        (3) Soldering method by oxy-acetylene gas
        (4) Forms of joint:
            (i) Butt joint—V bevel
            (ii) Lap joint—plain lap
III. Results—

A. *Melting and Solidification Points*

TABLE 1.—MELTING AND SOLIDIFICATION POINTS

| Code | Name | Melting pt. E.M.F. (mv.) | Contact temp. (° C.) | Melting pt. temp. (° C.) | Solid. pt. E.M.F. (mv.) | Contact temp. (° C.) | Solid. pt. temp. (° C.) | Interval between melting and solid pts. |
|---|---|---|---|---|---|---|---|---|
| a | ACAS solder | 7.8 | 17 | 174.75 | 7.7 | 17 | 172.25 | 3′9″ 4 |
| b | Alumit | 13.8 | 17 | 321.95 | 13.5 | 18 | 313.80 | 15″ 8 |
| c | Alumisolder | 8.4 | 17 | 188.75 | 8.0 | 18 | 178.75 | 2′57″ 6 |

NOTE.—Measurements conducted on aluminum plate of 2 x 50 x 100 mm. size. Thermometer used was as described under II-2.

B. Bend and Tensile Strength Tests

TABLE 2.—BEND AND TENSILE STRENGTH TEST RESULTS

| Test piece No. | Name of solder | Type of joint | Bend tests | | | Pull test force (kg./mm.²) |
|---|---|---|---|---|---|---|
| | | | Direction | Angle, degrees | Surface condition | |
| 1 | Alumit | Butt, V-joint | Front | 37 | Crack | |
| 2 | do | do | Back | 82 | do | |
| 3 | do | Lap | | 90 | do | |
| 4 | do | do | | | | 7.10 |
| 5 | do | Butt, V-joint | | | | 7.65 |
| 6 | ACAS solder | do | Front | 180 | Crack | (¹) |
| 7 | do | do | Back | 180 | Good | |
| 8 | do | Lap | | 150 | Crack | |
| 9 | do | do | | | | 10.03 |
| 10 | do | Butt, V-joint | | | | 7.03 |
| 11 | Alumisolder | do | Front | 82 | Crack | |
| 12 | do | do | Back | 88 | do | |
| 13 | do | Lap | | 102 | do | |
| 14 | do | do | | | | 12.35 |
| 15 | do | Butt, V-joint | | | | 3.80 |

¹ See table 3.

TABLE 3.—ACAS SOLDER TENSILE STRENGTH TEST RESULTS

| Test piece number | Thickness of plate (mm.) | Thickness of lap joint (mm.) | Length of lap joint (mm.) | Width of lap joint (mm.) | Pulling force (kg.) | Tensile strength (kg./mm.²) |
|---|---|---|---|---|---|---|
| L1 | 0.49 | 1.24 | 17.9 | 18.0 | 115 | 13.0 |
| L2 | 0.49 | 1.18 | 19.2 | 19.6 | 110 | 11.4 |
| L3 | 0.49 | 1.04 | 18.0 | 18.7 | 110 | 12.0 |
| C1 | 0.49 | 1.12 | 18.0 | 18.5 | 110 | 12.1 |
| C2 | 0.49 | 1.06 | 18.0 | 18.0 | 110 | 12.4 |

NOTE.—In every case breakage occurred in the mother metal.

What we claim is:

A non-corrosion solder for light metal alloys consisting essentially of 1.5 to 3 percent of silver; 72 to 94 percent of tin; 1 to 3 percent of copper; 6 to 9 percent of aluminum; 0.2 to 0.4 percent of silicon; 0.1 to 0.3 percent of indium; and 3 to 5 percent of cadmium.

References Cited in the file of this patent

UNITED STATES PATENTS

| | | |
|---|---|---|
| 968,203 | Silver | Aug. 23, 1910 |
| 2,467,780 | Reinhold | Apr. 19, 1949 |
| 2,916,815 | Donkerwoort | Dec. 15, 1959 |